J. HOLLIS.
RETRIEVING MECHANISM.
APPLICATION FILED MAY 24, 1911.

1,056,742.

Patented Mar. 18, 1913.

Witnesses
Edwin L. Bradford
Geo. B. Pitts

Inventor
Joseph Hollis
By
Edward R. Alexander
Attorney

J. HOLLIS.
RETRIEVING MECHANISM.
APPLICATION FILED MAY 24, 1911.

1,056,742.

Patented Mar. 18, 1913.

Witnesses
Edwin L. Bradford
Geo B Pitts

Inventor
Joseph Hollis
By Edward R. Alexander
Attorney

J. HOLLIS.
RETRIEVING MECHANISM.
APPLICATION FILED MAY 24, 1911.

1,056,742.

Patented Mar. 18, 1913.

Witnesses
Edwin L. Bradford
Geo. B. Pitt

Inventor
Joseph Hollis
By Edward R. Alexander
Attorney

UNITED STATES PATENT OFFICE.

JOSEPH HOLLIS, OF CANTON, OHIO, ASSIGNOR TO JOHN E. McLAIN, OF CANTON, OHIO.

RETRIEVING MECHANISM.

1,056,742.  Specification of Letters Patent.  Patented Mar. 18, 1913.

Application filed May 24, 1911. Serial No. 629,196.

*To all whom it may concern:*

Be it known that I, JOSEPH HOLLIS, citizen of the United States, residing at Canton, in the county of Stark and State of Ohio, have invented certain new and useful Improvements in and Relating to Retrieving Mechanism, of which the following is a specification.

This invention relates to a rope controlling and trolley retriever mechanism, which effects the retrieving of a trolley pole when the trolley wheel thereof jumps or leaves the conducting wire, and operates to maintain the rope connected to the trolley pole substantially taut while the trolley wheel remains in engagement with the trolley wire or conductor and moves up and down relative to the roof of the car.

For the purpose of illustration, I have, in the accompanying drawings, shown and herein described one form of retrieving mechanism embodying my invention.

In the drawings, 1 indicates a casing preferably comprising two main parts or members $1^a$, $1^b$, adapted to house the retrieving mechanism.

$1^c$, $1^c$, indicate arc shaped flanges formed integrally upon opposite sides of each of the main casing parts, the flanges of one part being adapted to engage with the flanges of the other part.

$1^d$, $1^d$, indicate apertured lugs projecting from the flanges $1^c$, the lug of one flange of one part being arranged to aline with the lug of the adjacent flange of the other part, whereby the said parts may be secured together by suitable bolts.

2 indicates a casing, secured by bolts $2^a$ to the back or rear wall $1^x$ of the casing part or member $1^a$.

3, 3, indicate a plurality of projections, preferably formed integrally with the casing 2. These projections form part of a bayonet connection with a suitable member (not shown) carried by the dash or other part of a car.

$3^a$ indicates a pivoted member, adapted to engage with the member carried by the car, for holding the retriever casing 1 in position upon said member.

4 indicates a drive shaft preferably arranged concentrically of the casing 1.

5 indicates a disk or circular plate provided with a sleeve $5^a$ through which the shaft 4, which is preferably reduced near one end, extends. The reduced end of the shaft 4 and the sleeve $5^a$ project through an opening $1^e$ in the back $1^x$ of the casing part $1^a$ into the spring casing 2.

$1^f$ indicates a bearing provided on the rear wall $1^x$ for rotatably supporting the sleeve $5^a$ and shaft 4.

$1^g$ indicates a bearing formed in the casing part $1^b$ for the outer end of the shaft 4.

6 indicates a retrieving spring adapted to rotate the disk 5. This spring is mounted within the casing 2 and has one end connected thereto. $6^a$ indicates an arbor to which the other end of the spring 6 is connected by suitable ratchet means.

$6^b$ indicates a pin or key extending through the shaft 4, sleeve $5^a$ and arbor $6^a$ and rigidly connecting these parts together. The arbor surrounds that portion of the sleeve which extends into the casing and has bearing at its opposite circumferential edges with the opposing faces of the rear wall $1^x$ for the casing part $1^a$ and the casing 2. By this construction the arbor prevents endwise movement of the shaft 4.

7 indicates a drum or reel on which a trolley rope 8 is wound, the rope being connected at its upper end to a trolley pole. The rope 8 is wound on the drum or reel 7 in the retrieving operation of the trolley pole and is unwound therefrom to permit the replacing of the trolley wheel upon the conductor; at the same time operating to rewind the main spring and put it under tension ready for the next retrieving operation. The drum 7 preferably comprises a web $7^a$, a hub $7^b$, having an extended sleeve $7^c$ loosely mounted on the shaft 4, and a flanged rim $7^d$.

$7^x$ indicates an opening formed in the rim $7^d$ of the drum.

$7^{x'}$ indicates a slot form in the rim $7^d$ leading from one side of the opening $7^x$ in a circumferential direction. That end of the rope which is wound on the drum is preferably knotted, as shown at $8^a$ and inserted through the opening $7^x$. The rope 8 is then moved into the slot $7^{x'}$, the knot engaging the inner surface of the drum rim on opposite sides of the said slot and thereby connecting the rope 8 to the drum 7. Those surfaces of the rim $7^d$ upon opposite sides of the slot $7^{x'}$ with which the knot $8^a$ engages, are preferably inclined from the inner or closed end of the slot to its open end, as shown at $7^{d'}$. The purpose of this is to facilitate the removal and detachment of the rope from the drum. This is usually accomplished by unwinding the rope, and when its end is reached, the knot will automatically slide down the inclined surfaces $7^{d'}$ and free itself from the drum.

9 indicates a reel spring mounted in a circular recess or depression $1^h$, which is preferably formed in the back or rear wall of the casing member $1^b$. One end of this spring is adjustably anchored to the casing or wall of the recess $1^h$ and its opposite end is detachably connected to the sleeve $7^c$ of the drum or reel 7, as will be later described. The spring 9 tends to rotate the drum 7 in an anti-clockwise direction (see dotted arrows in Figs. 8, 9, 10 and 11). Its function is to exert sufficient force on the drum to keep the rope 8 substantially taut and take up all slack, which may exist therein, between the drum 7 and the trolley pole during the normal operation of the device. When the rope 8 is wound on the drum 7, the force of the spring is expended, and when it is unwound therefrom, the spring is again placed under tension to operate the drum.

$1^i$ indicates a series of inwardly projecting stops, having relatively wide faces $1^j$, provided on the inner circumferential wall of the depression or recess $1^h$.

$9^a$ indicates a strip of resilient metal extending partly around the depression $1^h$ and frictionally engaging with the faces $1^j$ of the stops $1^i$. The outer end of the spring 9 is connected to the strip $9^a$ at a point removed from its front end, so as to leave a forwardly extended free end $9^{a'}$. This free end $9^{a'}$ expands slightly outward and engages with the side wall of the adjacent stop $1^i$, thus forming an anchor for the outer end of the said spring 9. In the event however the spring 9 is overwound, as may be the case when resetting the retrieving spring 6, such overwinding will result in drawing the forward extended end $9^{a'}$ of the strip $9^a$ inwardly slightly beyond the face $1^j$ of the adjacent lug $1^i$ and pulling or sliding the strip $9^a$ around the recess $1^h$ until its forward extended end abuts against the next or succeeding stop $1^i$. If the operation of winding up the spring 9 is continued, beyond a predetermined point, it will result in sliding the strip $9^a$ from one tooth to another, thereby preventing overwinding and breaking of the spring. It will thus be seen that the strip $9^a$ operates as a movable or adjustable connecting means between the outer end of the spring 9 and the casing member $1^b$, which means permit the spring 9, in its wound-up condition to be adjusted to a position ready to rotate the reel immediately following the re-setting of the retriever spring; furthermore, as just stated such adjustable connection obviates breakage of the spring by overwinding.

In the form of construction herein described it will be understood that the function of the absorbing spring 9 is to take up the slack occurring in the trolley rope and to pay out the rope as the trolley wheel runs along the over-head conductor. This spring is therefore relatively weak; whereas the retriever spring 6 is of a length and strength to effect a retrieving of the trolley pole against the tension of the trolley pole springs. The spring 6 is therefore of such size that it will rotate the drum 7 for a considerable time in order that the full length or a considerable portion of the trolley rope is wound thereon, and, in expending its force, rotates the drum much faster and to a greater extent than the spring 9 could possibly rotate it. In order to permit this free movement of the drum 7 independently of the spring 9, the circumferential wall of the hub sleeve $7^c$ is cam shaped around that portion which is surrounded by the inner convolution of the spring 9 and formed with a shoulder $7^f$.

$9^b$ indicates a plate or device carried by the inner end of the spring 9 and adapted to engage the shoulder $7^f$. The tension of the spring 9 operates to keep the plate $9^b$ and shoulder $7^f$ in operative relation normally, but when the drum or reel 7 is rotated by the spring 6, the plate or device $9^b$ rides the cam wall of the sleeve $7^c$. At each revolution of the drum, the plate $9^b$ drops behind the shoulder $7^f$ ready to engage therewith when the drum is rotated in the opposite direction. It will thus be seen that the spring 9 may automatically connect and disconnect itself with the drum sleeve $7^e$ at its inner end.

The spring 6 like the spring 9, is re-set or wound up by the act of unwinding the rope 8 from the drum 7. When this operation takes place it will be understood that the spring 9 becomes completely wound in advance of the spring 6. But by providing the adjustable anchor or, connection $9^a$ for the outer end of the spring 9, the unwinding of the rope 8 can be continued until the spring 6 is wound up to its limit, as has already been described, without any danger of overwinding the spring 9. It will thus be seen that the connections for the opposite ends of the slack absorbing spring 9, while allowing the said spring to exert its force upon the drum as long as the trolley wheel remains on the conductor, permit the drum to rotate indefinitely in one direction for the retrieving operation and indefinitely in the opposite direction for re-setting the retriever spring.

Means are provided for automatically setting or locking the spring 6 in wound up condition and for connecting the disk to the drum 7 to effect the retrieving of the trolley. Of these means, $7^g$ indicates a ring concentrically mounted on the inner side or face of the drum or reel 7 and preferably formed integrally therewith.

$7^h$ indicates a series of ratchet teeth formed on the inner face of the ring $7^g$.

10, 10, indicate a plurality of radially extending pins or rods spaced from each other upon the disk 5, and each slidingly mounted in a guide block $10^a$ carried thereby.

$10^b$ indicates a device at the outer or free end of each pin 10 adapted to engage a tooth $7^h$ and lock the disk and drum 7 together when the pin is moved outwardly. The blocks $10^a$ and disk 5 are preferably cut away, as shown at $10^c$, to permit the pins or rods to be retracted or moved inwardly far enough to bring the engaging devices $10^b$ out of the path of the ratchet teeth $7^h$ and within the contour of the disk 5.

11 indicates a swingable lever having a hub which is loosely mounted on the shaft 4.

$11^a$, $11^a$, indicate a plurality of arms fixed or formed integral with the lever 11 and each carrying at its free end a cam $11^b$ arranged to engage with and move or slide the adjacent pin or rod 10 outwardly.

$11^c$ indicates a spring suitably mounted on the disk 5 and having an arm which engages with and moves the lever 11 in one direction. When the lever 11 is released from the locking mechanism, as will be later described, the spring $11^c$ swings the lever about the shaft 4 and thus causes the cams $11^b$ to operate the pins or rods 10.

$10^d$ indicates a spring connected at its opposite ends to the pins or rods 10 and operating normally to maintain them in their retracted position in the path of the cams $11^b$. The spring $10^d$ is comparatively weak in order that the cams $11^b$ will operate instantly under the influence of the spring $11^c$. The inner ends of the pins 10 are preferably inclined to form suitable engaging walls for the cams $11^b$.

The lever 11 preferably extends radially to the edge of the disk 5 and is provided at its free end with an arm $11^e$ which extends in a lateral direction beyond the opposite face of the disk 5. As shown, the disk 5 is cut away at $5^b$ to receive the arm $11^e$ and one end wall $5^c$ of the cut-away portion $5^b$ forms a stop for the arm $11^e$.

$5^d$ indicates a lug or projection preferably formed integrally with the disk 5 and serving to limit the movement of the lever 11 under the influence of the spring $11^c$.

12 indicates a spiral rib provided on the under face of the disk 5, the walls of which rib form a spiral groove $12^a$ extending from the edge of the disk 5 approximately to the center thereof. The inner end of the rib 12 terminates at a point slightly remote from the circumferential wall of the sleeve $5^a$ so as to form a continuous groove $12^b$ around the said sleeve. The opposite end of the rib 12 is constructed to form a relatively wide opening $12^c$ to the spiral groove $12^a$ and terminates in an outwardly inclined wall or cam $12^d$.

13, $13^a$, indicate a pair of spaced ribs mounted on the inner face of the rear wall of the casing member $1^a$, and forming between them a radially extending groove $13^b$. 14 indicates a lock member or bolt adapted to slide in said groove $13^b$.

Figure 13:
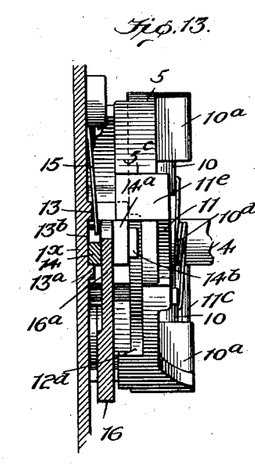
Figure 14:
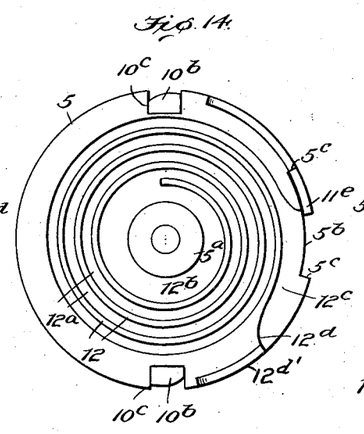
Figure 15:
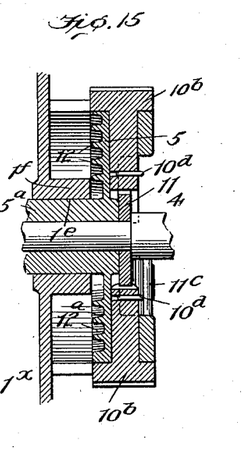

$14^a$ indicates a head carried by the bolt 14 at or near its inner end. The head $14^a$ is adapted to engage with the arm $11^e$, (see Figs. 8, 9 and 13) which in turn engages the stop $5^c$ and thus locks the disk 5 against rotation by the spring 6.

$14^b$ indicates a tongue provided on the head $14^a$ and adapted to extend into the spiral groove $12^a$. The tongue $14^b$ is preferably slightly curved in order to conform to the shape of the groove.

As the bolt 14 is free to slide inwardly and outwardly, radially, relative to the axis of the disk, the walls of the groove $12^a$, acting on the tongue $14^b$, will cause such movement of the bolt accordingly as the disk 5 is rotated. For instance, when the disk 5 is rotated by the spring 6, the bolt 14 slides inwardly; when the disk is rotated in the opposite direction (which rotation takes place when the rope 8 is unwound from the drum 7 in resetting the spring 6), the bolt 14 is moved outwardly.

14ᶜ indicates a cut-away portion formed in the bolt 14 having end walls 14ᵈ, 14ᵉ.

15 indicates a spring having an arm 15ᵃ mounted in the cut-away portion 14ᶜ and arranged to engage the end wall 14ᵈ of the lock member or bolt. The spring arm 15ᵃ is put under tension when the bolt is moved inwardly and then exerts its force to move the bolt 14 outwardly. When the disk is rotated in a clock-wise direction, (see full line arrows which indicate direction of rotation when rope 8 is being unwound from the drum 7), the tongue will automatically enter the groove 12ᵃ.

16 indicates a trip or bolt throwing device for sliding the bolt 14 inwardly to release the arm 11ᵉ. This device preferably comprises a lever pivotally mounted at one end on the rear wall or back 1ˣ of the casing part 1ᵃ, an arm 16ᵃ adapted to engage a shoulder or projection 14ᶠ provided on the bolt 14, and a lug 16ᵇ. The free end of the trip lever preferably extends through a suitable slot 1ᵃ′ formed in the casing whereby the lever can be manually operated at any time.

17, 17, indicate a plurality of dogs, each pivotally mounted on a pin or stud 7ᵏ carried by the drum 7. These dogs revolve with the drum and their free ends swing outwardly under the influence of centrifugal force. By this operation one of the dogs engages with the lug 16ᵇ of the lever, throws the latter and thus moves or slides the bolt 14 inwardly.

17ᵃ, 17ᵃ, indicate a plurality of springs, one for each dog, for holding the dogs normally retracted. The springs 17ᵃ are of sufficient strength to maintain the dogs retracted or against the outer circumferential wall of the ring 7ᵍ during the rotation of the drum 7 in paying out and taking up the slack in the rope 8. However, when the trolley wheel jumps the conductor or wire, the up-pull on the rope 8 imparts a high rotative speed to the drum 7. The centrifugal force set up by the rotation of the drum throws the free ends of the dogs outwardly in position to strike the lug 16ᵇ and operate the bolt thrower. The lug 16ᵇ of the lever 16 is preferably mounted thereon so as to be engaged by the free end of one of the dogs 17 only when the latter is in its outermost position. Each of the dogs 17 is preferably formed with a notch 17ᵇ to receive the lug 16ᵇ.

16ᶜ indicates a spring which exerts its force to maintain the tripping device in outer position, as shown in Figs. 8, 9, 10 and 11, that is to say, against that end wall of the slot 1ᵃ′ remote from the bolt 14.

18 indicates a flat spring overlying the radial groove 13ᵇ and adapted to engage the sliding bolt 14. When the bolt is moved outwardly into locking position, its free end is forced beneath the spring 18. This spring operates to hold the bolt 14 in locking position and prevents it from being jarred out of such position, or moved inwardly while the disk 5 is being rotated by the spring 6 into locked position.

19 indicates a plate which is secured to the back of the casing member 1ᵇ by suitable screws 19ᵃ. This plate is preferably arranged to fit over and close the depression 1ʰ formed in the back of the said member 1ᵇ. It is formed with an opening 19ᵇ through which the shaft 4 extends.

19′ indicates a pin or projection which registers with and fits into an opening or recess 1ᵏ in the casing member 1ᵇ, whereby the said plate 19 may be properly positioned thereon.

19ᶜ indicates a sleeve or collar, preferably formed integrally with the plate 19, and extending therefrom toward the web 7ᵃ of the drum 7.

19ᵈ indicates a series of ratchet teeth provided on the outer circumferential wall of the collar 19ᶜ.

20 indicates a plate swingably mounted at one end upon a suitable pivot or stud shaft projecting from the web 7ᵃ of the drum 7. The plate 20 is preferably provided with a hub 20′ which forms a bearing member for the plate, the hub being held in place on the said shaft by a washer 20ᵃ and screw or other locking device 20ᵇ. The free end of the plate overlies the opening 7ˣ and slot 7ˣ′ formed in the drum rim 7ᵈ and is preferably curved at its free end to conform to the contour of the rim.

20ᶜ indicates a spring, which may surround the shaft for the plate 20. One end or arm of the spring engages the said plate and yieldingly holds it in engagement with the inner surface of the rim immediately behind the opening 7ˣ therein.

Figure 5:
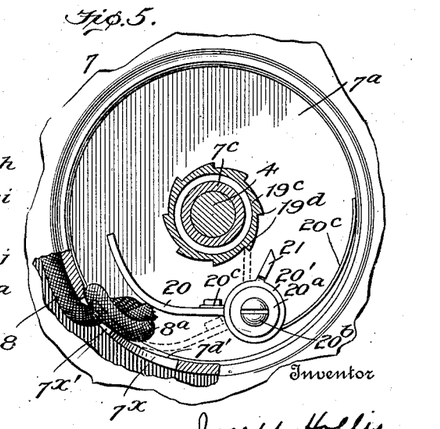
Fig. 5 is a fragmentary side view, partly in section, on the line 5—5 of Fig. 1.
Figure 6:
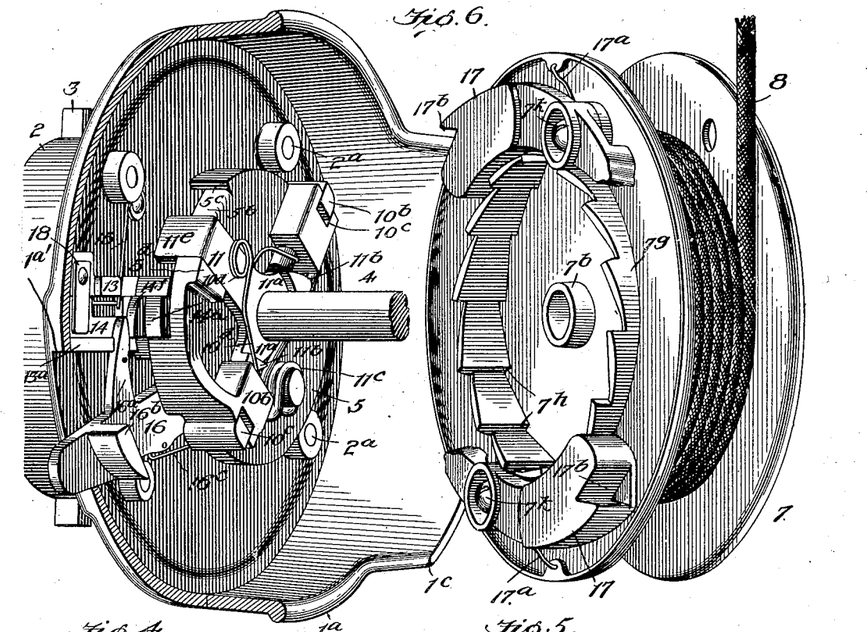
Fig. 6 is an enlarged perspective view of one part of the casing and the parts carried thereby, the spring locking and releasing mechanism, the drum or reel, and the parts for connecting the spring controlled parts to the drum or reel, the latter being separated from the spring controlled parts.
Figure 7:
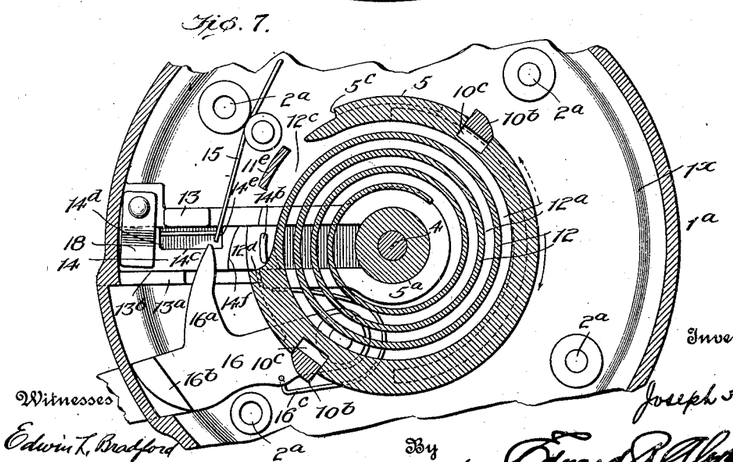
Figs. 7 to 11 are fragmentary views, partly in section, showing parts of the retrieving and spring locking and releasing mechanism in the positions they assume while being operated.

21 indicates a pawl operated into and out of engagement with the ratchet teeth 19ᵈ by the movement of the plate 20. The pawl 21 extends from and is preferably formed integrally with the hub 20′ and is arranged to engage the teeth 19ᵈ when the plate 20 is in normal position against the drum rim 7ᵈ, as shown in dotted lines in Fig. 5. The purpose of the pawl 21 is to prevent the unwinding of the springs 6 and 9 by locking the drum against rotation when the rope 8 is disconnected from the drum. Thus it will be understood that when the retrieving mechanism is set and before the rope 8 has been connected to the drum 7, the spring 20ᶜ holds the plate 20 against the rim 7ᵈ with the pawl 21 in engagement with the ratchet teeth 19ᵈ; then when the rope is connected to the drum, the act of inserting the knot $8^a$ through the opening $7^x$ operates to swing the plate and simultaneously disconnect the pawl 21 from the adjacent tooth $19^d$. The drum 7 is then released and free to be rotated by either or both springs 6 and 9. Should it become necessary to disconnect the rope 8 from the drum 7 for any reason, the removal of the knot $8^a$ through the opening $7^x$ permits the return of the plate 19 to normal position, thus automatically effecting a locking of the drum. By this construction it will be seen that after the parts are once assembled, the connection and disconnection of the trolley rope from the winding drum can take place as often as desired without the necessity of unwinding and rewinding either or both of the drum rotating springs.

Figure 1:
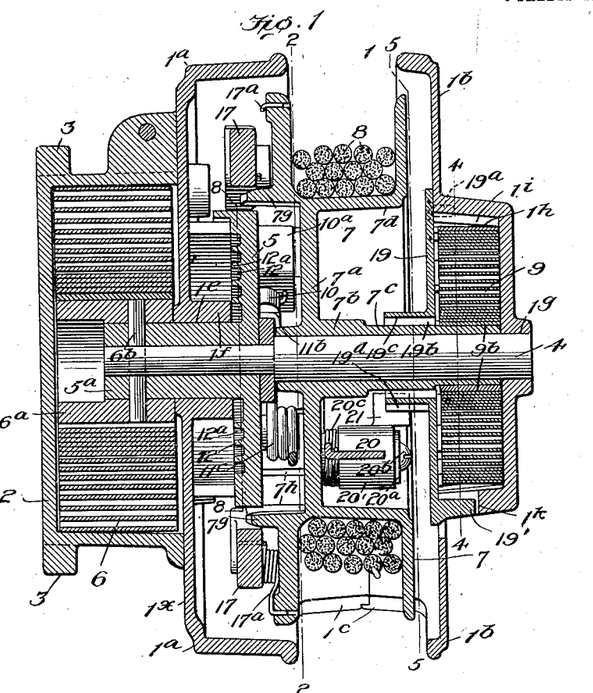
Figure 1 is a vertical longitudinal sectional view through a trolley retriever and rope controlling mechanism embodying my invention.
Figure 2:
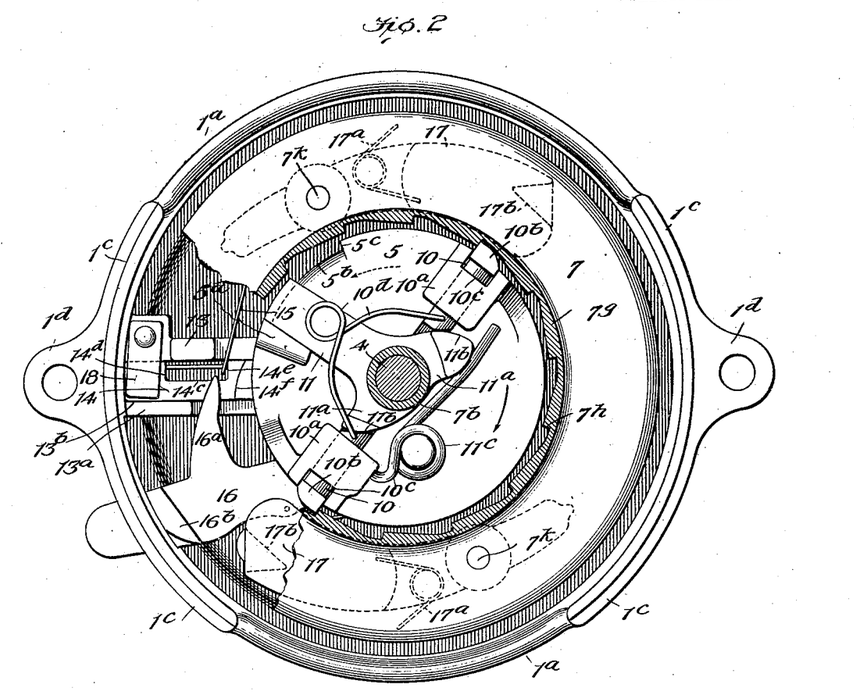
Fig. 2 is a transverse sectional view on the line 2—2 of Fig. 1.
Figure 3:
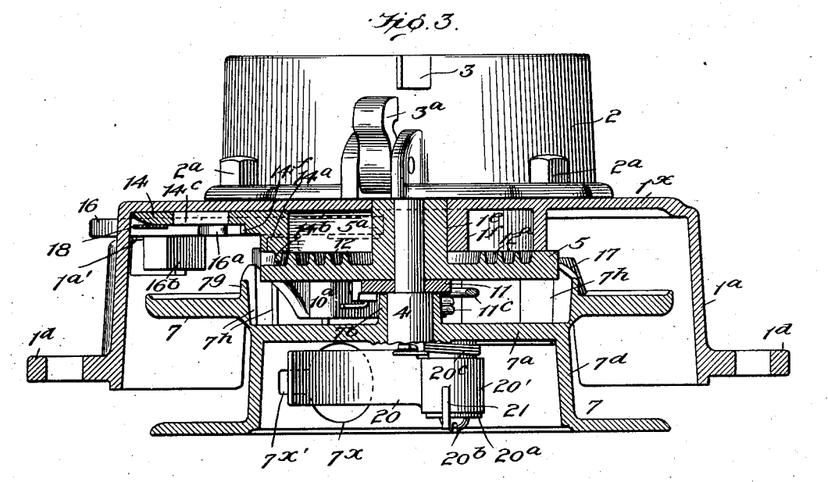
Fig. 3 is a horizontal sectional view partly in plan, one side of the casing and the mechanism carried thereby being omitted.
Figure 4:
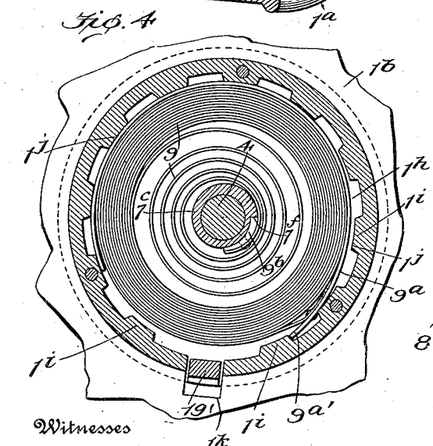
Fig. 4 is a fragmentary sectional view on the line 4—4 of Fig. 1.
Figure 8:
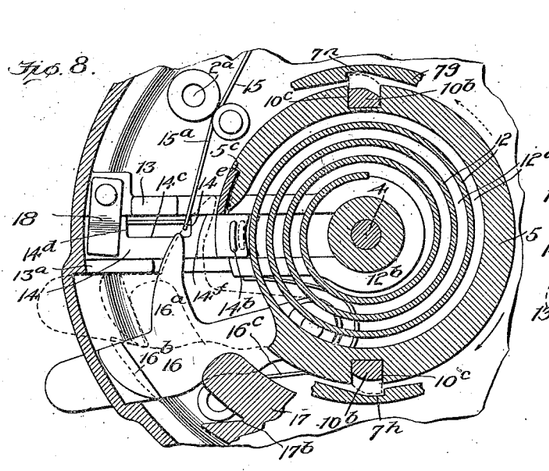
Figure 9:
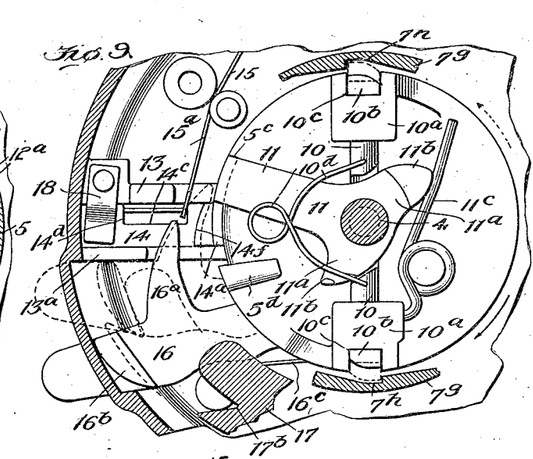

The operation of the retrieving mechanism may be described as follows: Figs. 1, 8, and 9 illustrate the position of the parts when the spring 9 is acting upon the drum 7 to maintain the trolley rope taut as long as the trolley wheel remains in engagement with the conductor. Figs. 8 and 9 being taken on the lines 8, 8, and 2, 2, respectively of Fig. 1, looking in the same direction, illustrate the locking bolt head $14^a$ in engagement with the arm $11^e$ and the spring 6 set, or wound up, ready to rotate the disk 5 and drum upon the throw of the bolt 14. Assume now that the trolley wheel jumps or leaves the conductor. The trolley pole tension springs immediately force the trolley pole upwardly, which upward movement imparts an up-pull on the trolley rope 8 and thus effects a rapid rotation of the drum 7. The centrifugal force set up by the rotation of the drum 7 moves the free ends of the dogs 17 outwardly, one of which strikes the lug $16^b$ of the trip or bolt throwing device 16 and swings the latter into engagement with the shoulder $14^f$ of the bolt 14 (see dotted line in Figs. 8 and 9). The blow of the lever 16 against the bolt 14 slides the latter inwardly. This operation moves the head $14^a$ from behind the arm $11^e$, and effects the release of the disk, which is now free to be driven by the spring 6. The inward movement of the bolt 14 also moves the tongue $14^b$ into the mouth of the groove $12^a$. Simultaneously with or immediately following the disengagement of the bolt head $14^a$ from the arm $11^e$, the spring $11^c$ swings the lever 11 about the shaft 4 and moves the cams $11^b$ into engagement with the pins 10, which in turn operate the teeth engaging devices $10^b$. The disk 5 is now connected to the drum 7 and imparts its rotative movement thereto to retrieve the trolley pole, until the force of the spring 6 is entirely expended, or until its power and the power of the trolley pole tension springs react upon each other with equal force. The rotation of the disk 5 under the influence of the spring 6 slides the bolt 14 inwardly into the circular groove $12^b$, where it remains during the continued rotation of the disk.

Figure 10:
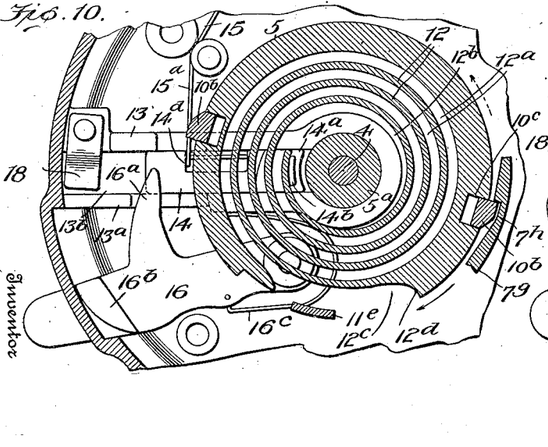
Figure 11:
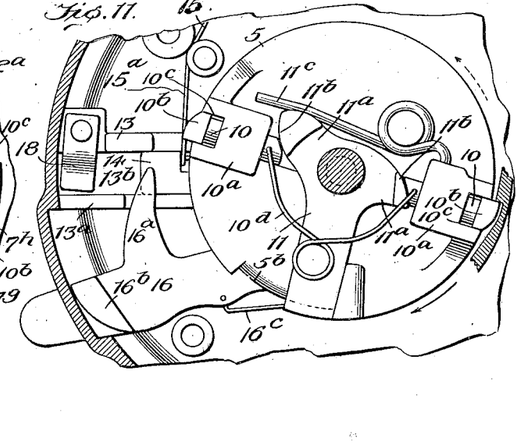
Figure 12:
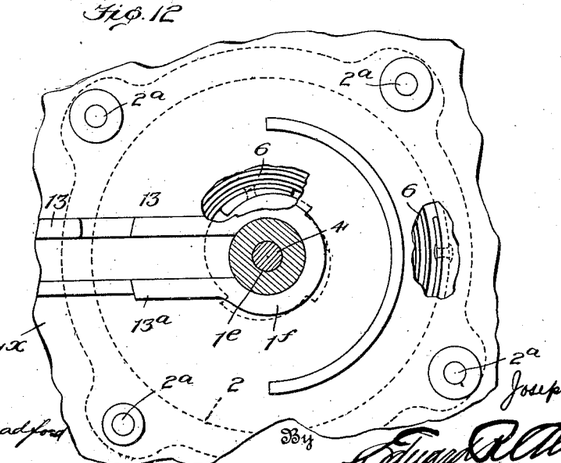
Figs. 12 to 15 are detail views.

Referring now to Figs. 10 and 11, which are taken on the same lines as Figs. 8 and 9, respectively, and looking in the same direction. These views illustrate the position of the parts when the trolley pole has been retrieved and before the main or retrieving spring has been wound up or reset. The resetting of the main spring, and also the slack absorbing spring is effected by rotating the disk in a clockwise direction. The disk 5 and drum 7 remain connected together through the teeth engaging devices $10^b$ at the end of the retrieving operation, because the force of the spring $11^c$ is still being exerted to press them into engagement with the teeth $7^h$. Hence, in unwinding the rope 8 off the drum, the disk 5 is rotated in the opposite direction and rewinds the retriever spring. This operation also operates, through the tongue and groove connection, to slide the bolt 14 outwardly. At the end of the groove $12^a$, the tongue is engaged by the cam $12^d$, which on account of its sharply curved face moves the bolt 14 outwardly suddenly with the head $14^a$ thereof positioned immediately behind the arm $11^e$. A shoulder $12^{d'}$, provided on the disk 5, then engages the head $14^a$ and prevents the continued rotation of the disk 5. The pull on the rope 8 is then relaxed, permitting the disk to rotate in an anti-clockwise direction under the influence of the springs 6 and 9. By this latter operation, the lever $11^e$ engages with the bolt head $14^a$, and the continued rotation of the disk 5, actuated by the spring 6, brings the shoulder or stop $5^c$ into engagement with the arm $11^e$, the bolt head, operating through the arm $11^e$ to lock the disk against rotation, thus setting the spring 6. When the stop $5^c$ bears against the arm $11^e$, which in turn engages the bolt head $14^a$, it carries the pressure of the retriever spring and relieves the engaging devices $10^b$ thereof. The latter are then drawn inwardly by the spring $10^d$. Upon the relaxation of the rope 8 and the movement of the lever 11 which takes place during the slight rearward movement of the disk 5 until the arm $11^e$ engages with the stop $5^c$, the cams $11^b$ are moved out of engagement with the pins 10 which latter are free to move inwardly, and as soon as the disk 5 becomes locked and the drum 7 is rotated under the influence of the spring 9, the tension or pressure against the teeth engaging devices is released or removed whereupon the latter are moved inwardly or retracted under the influence of the spring $10^d$.

To those skilled in the art of making retrieving mechanism of the class described, many alterations in construction and widely differing embodiments and applications of my invention will suggest themselves, without departing from the spirit and scope thereof. My disclosures and the description herein are purely illustrative, and are not intended to be in any sense limiting.

I have had in mind particularly the improving of the patented trolley retriever of A. W. Knutson, described and claimed in Reissue Letters Patent of the United States No. 12722 dated November 19, 1907. One of my objects has been to provide for the use of a shorter and less expensive slack absorbing spring than it was advisable to use in the Knutson device, and this I have accomplished by the automatic releasing devices for each end of the absorbing spring in my retriever, thereby providing against any possible overwinding or severe straining to the point of breaking of that spring. Again, I have sought to combine with certain of the parts of the Knutson retriever means for automatically locking either spring against unwinding when the trolley rope is removed from the drum, at the same time facilitating the introduction of and withdrawal of the trolley rope from the drum or reel. I have also provided for a greater freedom of operation of the trolley rope, allowing ample space in and through the casing for this purpose.

It will be noted that the desired degree of tension of the slack absorbing spring may be obtained by rotating the drum or reel until such point is reached, it being understood that you cannot overwind either spring because after a certain point has been reached in its winding, the spring plate or strip at the outer end of the slack absorbing spring will slip over the lugs or stops in the casing making a sound which may be readily heard or detected. It will also be noted that the connections between both springs, namely, the retriever spring on the one hand and the slack absorbing spring on the other hand, and the reel are such that the rotation of the reel in rope unwinding direction is utilized for winding both springs to the desired degree of tension, and that I have provided means for locking the retriever spring against action and separate means for preventing the drum from rotating under the influence of the slack absorbing spring under certain conditions.

What I claim is:—

1. In a trolley retriever, the combination of a casing, a retrieving spring mounted therein, a slack absorbing spring in the casing, a rotatable trolley rope reel, means for winding and locking the retrieving spring against action, the winding operation being effected by the unwinding of the trolley rope from said trolley rope reel, and means interposed between said trolley rope reel and the slack absorbing spring for winding and locking the latter against action.

2. In a trolley retriever, the combination of a casing, a retrieving spring mounted therein, a slack absorbing spring in the casing, a rotatable trolley rope reel, means for winding and locking the retrieving spring against action, the winding operation being effected by the unwinding of the trolley rope from said trolley rope reel, connections between said trolley rope reel and the slack absorbing spring operating to wind the slack absorbing spring when the trolley rope reel is rotated in one direction, and means for locking the trolley rope reel at will against rotation by said slack absorbing spring in spring-unwinding direction.

3. The combination of a casing, a retriever spring, a drive shaft connected to said retriever spring, a trolley rope reel, connections between said rope reel and said drive shaft, a slack absorbing spring, and automatically acting attaching and detaching means interposed both between one end of said slack absorbing spring and said reel, and between the other end of said spring and the casing, and arranged to prevent the breaking of said spring by any amount of rotation of said reel in either direction.

4. In a trolley retriever, the combination with a casing, of a drive shaft rotatably mounted in the casing, a retrieving spring connected to the shaft, a rope reel mounted on the shaft, a slack absorbing spring having adjustable connections at one end with the casing and detachable connections with the reel at the other end, mechanism located between the reel and the retrieving spring for locking the retrieving spring against action, and separate and independent means located between said reel and the slack absorbing spring for locking the reel against rotation by said slack absorbing spring.

5. In a trolley retriever, the combination with a casing, of a drive shaft rotatably mounted in the casing, a retrieving spring connected to the shaft, a rope reel mounted on the shaft, and a relatively short slack absorbing spring having adjustable connections at one end with the casing and detachable connections with the reel at its other end; the said connections at the opposite ends of said slack absorbing spring permitting the reel to rotate in either a rope winding or unwinding direction indefinitely.

6. The combination with a shaft, of a rope winding reel loosely mounted thereon, a retriever spring, means for locking said retriever spring after it has been wound, connections operating to rotate the reel upon release of said locking means, a slack absorbing spring, connections between said slack absorbing spring and said reel normally acting to rotate the drum in one direction, a stationary collar surrounding the shaft and arranged between the slack absorbing spring and the reel, and means interposed between said collar and reel for locking the reel against rotation by said slack absorbing spring.

In testimony whereof I affix my signature, in the presence of two witnesses.

JOSEPH HOLLIS.

Witnesses:
A. M. McCarty,
H. C. Poutins.

Copies of this patent may be obtained for five cents each, by addressing the "Commissioner of Patents, Washington, D. C."